Patented Aug. 17, 1937

2,090,467

UNITED STATES PATENT OFFICE 2,090,467

WATER PURIFYING MATERIAL AND METHOD OF PREPARING AND USING THE SAME

George Borrowman, Evanston, Ill.

No Drawing. Application February 1, 1936, Serial No. 61,891

9 Claims. (Cl. 210—23)

This invention relates to the improvement of humic substances such as peat, lignite or brown coals for use in water purification, as more fully hereinafter described and claimed.

Humic substances are the result of the decay of vegetable matter. The alteration involves the formation of acidic compounds known as humus acids, and in the products mentioned above these acids are more or less neutralized by contact with bases of ground waters forming brownish compounds such as calcium and magnesium humates.

I find that such humic substances will to some extent remove dissolved oxygen from water, the amount removed depending on the time of contact, temperature, etc. This is a useful result, since in closed water systems corrosion of iron pipe is directly proportional to the amount of dissolved oxygen in the water. Using, for example, granulated lignite of −20 +50 mesh size, I find that 374 cubic centimeters of oxygen are removed per hour per cubic foot of filter bed with water having about 20.8 cubic centimeters per gallon of dissolved oxygen at a temperature of 22° C. and a filtration rate of 105 gallons per cubic foot of filter bed per hour.

I find that the removal of dissolved oxygen from water is much facilitated by humic substances if the material is converted to a product comprising an intimate union with certain substances capable of existing in more than one state of oxidation, such as certain metallic oxides, as iron oxide, copper oxide, etc. Of especial utility in this connection are the oxides of iron. Organic compounds possessing the property of becoming oxidized or reduced are to be considered as within the purview of this invention.

These products may be prepared in various ways. For example, copper, cobalt and nickel may be introduced into the humic material by means of ammoniacal solutions of those metals, and the latter may be prepared by treating solutions of salts of the said metals or mixture thereof with an amount of ammonia sufficient to redissolve the precipitate first formed. When the humic material is treated with such ammoniacal solutions, the ammonium radicle and the metal are taken up by the humic material. The metal is fixed but the ammonium radicle is removable by base-exchange. Iron oxide may best be incorporated with the humic material by utilizing the base-exchange power of the humic compounds. If a humic material is treated with a solution of an iron salt, such as ferrous or ferric chloride, base-exchange takes place between the bases in the humic material and the iron in the solution. Iron thus enters the material to an extent depending upon the strength of the iron solution, rate of filtration, etc. The iron thus taken up is again removable by base exchange. If the iron-containing humic material is thereupon treated with an alkaline solution, such as ammonium hydroxide, the iron is replaced by the ammonium radicle, and the iron is converted into insoluble iron hydroxide which thereby becomes incorporated in the humic material.

My preferred procedure is to treat lignite or brown coal with a solution of ferrous chloride. I make a filter bed of lignite granules of −20 +50 mesh size. The bed is first backwashed to remove air, and connection is then made with the source of ferrous chloride solution, which is allowed to filter slowly through the lignite bed. I find it preferable to prepare the ferrous chloride solution as needed by treating a bed of iron turnings with hydrochloric acid and letting the ferrous chloride, free of excess acid, percolate from the iron bed directly onto the lignite bed. When the lignite is saturated with iron by base-exchange, it is washed with distilled water until free of excess iron. This product is then treated with an excess of ammonium hydroxide and washed, thereby being rendered ready for use. Ferric chloride solution may be used instead of the ferrous chloride. The material as prepared above should be used as a filter bed. The lignite granules should be supported on sand and gravel in the manner in which zeolite filters are constructed. In operating the bed, it should first be backwashed to remove air, the container tank being filled with water and so maintained during use. The amount of dissolved oxygen removed from water filtered through the bed depends upon the rate of flow and temperature of the water. If the bed is allowed to remain idle periodically, the efficiency is greatly increased. The efficiency is also much increased by an increase in the temperature at which the water is filtered.

Lignite or brown coal, granulated and screened −20 +50 mesh, and impregnated with oxide of iron, removed 798 cubic centimeters of oxygen per cubic foot of filter bed per hour when water at 22° C. carrying 20.8 cubic centimeters of oxygen per gallon was filtered through the bed at 105.6 gallons per cubic foot of filter bed per hour. After a period of idleness, say overnight, the proportion of oxygen removed was greatly increased. At higher temperatures, also, the activity was much accelerated. No diminution of efficiency was observed after long use.

I claim:

1. A product comprising lignite or brown coal in which oxide of iron has been incorporated.

2. A product comprising lignite or brown coal in which ferrous oxide has been incorporated.

3. A composition comprising humic material and iron oxide.

4. A composition comprising humic material and ferrous oxide.

5. The process of making a water de-oxidizing composition which comprises affixing a compound of a metal having varying valences to humic material, by treating the latter with a solution of a salt of said metal and then with a reagent capable of forming an insoluble metal compound from said salt.

6. The process of making a water de-oxidizing composition which comprises affixing an oxide of a metal having varying valences to humic material, by treating the latter with a solution of a salt of said metal and then with a reagent capable of forming an insoluble metal compound from said salt.

7. The process of making a water de-oxidizing composition which comprises affixing an iron oxide to lignite or brown coal, by treating the lignite or brown coal with a solution of an iron salt and then with a solution of an alkali.

8. The process of removing dissolved oxygen from water which comprises contacting it with lignite or brown coal containing an iron oxide.

9. The process of removing dissolved oxygen from water which comprises contacting it with lignite or brown coal containing ferrous oxide.

GEORGE BORROWMAN.